United States Patent
Yamakado et al.

(10) Patent No.: US 7,616,216 B2
(45) Date of Patent: Nov. 10, 2009

(54) DIGITAL CONTENT CREATION SYSTEM, PROGRAM PRODUCT, AND STORAGE MEDIUM

(75) Inventors: Hitoshi Yamakado, Hino (JP); Atsushi Nagahara, Chino (JP)

(73) Assignee: Seiko Epson Corporation (JP)

( * ) Notice: Subject to any disclaimer, the term of this patent is extended or adjusted under 35 U.S.C. 154(b) by 412 days.

(21) Appl. No.: 11/641,519

(22) Filed: Dec. 19, 2006

(65) Prior Publication Data

US 2007/0139436 A1 Jun. 21, 2007

(30) Foreign Application Priority Data

Dec. 20, 2005 (JP) ............................. 2005-366887

(51) Int. Cl.
| | |
|---|---|
| G09G 5/00 | (2006.01) |
| G09G 5/02 | (2006.01) |
| G09G 5/36 | (2006.01) |
| G06K 9/00 | (2006.01) |
| H04N 9/64 | (2006.01) |
| G03F 3/08 | (2006.01) |
| H04N 1/46 | (2006.01) |

(52) U.S. Cl. .................. 345/589; 345/549; 345/586; 345/600; 345/643; 348/603; 348/651; 358/518; 358/520; 358/525; 358/538; 382/300; 382/164; 382/167; 382/173; 715/200

(58) Field of Classification Search ............. 345/589, 345/593, 586, 597, 600–606, 617–619, 643, 345/549; 348/557, 577, 602–603, 630, 639, 348/649, 651, 687, 703; 358/518–520, 525, 358/538, 452–453; 382/162, 164, 165, 167, 382/254, 274, 171–173, 298

See application file for complete search history.

(56) References Cited

U.S. PATENT DOCUMENTS

| 5,537,522 A | 7/1996 | Shibuta et al. |
| 7,016,075 B1 | 3/2006 | Tsukada |
| 2004/0119762 A1* | 6/2004 | Denoue et al. ............. 345/863 |
| 2005/0146537 A1 | 7/2005 | Yamakado et al. |
| 2007/0074109 A1 | 3/2007 | Nagahara et al. |

FOREIGN PATENT DOCUMENTS

| JP | 7-220101 | 8/1995 |
| JP | 08-055119 | 2/1996 |
| JP | 10-049529 | 2/1998 |
| JP | 2000-268112 | 9/2000 |
| JP | 2001-092956 | 4/2001 |
| JP | 2004-013457 | 1/2004 |
| JP | 2005-108137 | 4/2005 |

* cited by examiner

*Primary Examiner*—Wesner Sajous
(74) *Attorney, Agent, or Firm*—Harness, Dickey & Pierce, P.L.C.

(57) ABSTRACT

There is disclosed a digital content creation system including: a representative color obtaining section that obtains, from a digital content input, a characteristic amount of at least one representative color for the digital content input, the digital content input including a plurality of digital content sets and coloration information indicative of coloration for the plurality of digital content sets included in the digital content input; a coloration process determination section that determines coloration processing in accordance with the characteristic amount obtained by the representative color obtaining section; and a coloration processing section that changes the coloration information for the digital content sets included in the digital content input, in accordance with the coloration processing determined by the coloration process determination section.

13 Claims, 7 Drawing Sheets

DIGITAL CONTENT CREATION SYSTEM, PROGRAM PRODUCT, AND STORAGE MEDIUM

The entire disclosure of Japanese Patent Application No. 2005-366887, filed on Dec. 20, 2005 is expressly incorporated by reference herein.

BACKGROUND

1. Technical Field

The present invention relates to image processing. In particular, the invention relates to image processing for enhancing color consistency throughout a document.

2. Related Art

Image input devices such as digital still cameras and scanners, image processing devices such as personal computers, and image output devices such as printers are all in widespread use. Non-professional consumers of such devices now use them to create, process and output documents (digital content) which commonly contain images. Decisions on design features for such digital content, layout, coloration, and so on, are generally made by the consumer/user. An appearance of digital content created by general consumers/users having little expertise in design is likely to lack consistency and have limited aesthetic appeal as compared to content provided by professionals.

To address this problem, techniques for assisting design processing have been developed with the general user in mind so as to facilitate design processing by non-professionals (Refer, for example, to JP-A-7-220101, JP-A-2000-268112, and JP-A-8-55119). JP-A-7-220101 and JP-A-2000-268112 disclose techniques for automatically changing a design of tables in an input document on the basis of an instruction made by a user; while JP-A-8-55119 discloses a technique for automatically performing coloration processing on a document on the basis of an instruction made by a user.

The techniques disclosed in the references above are each designed to carry out design processing on the basis of instructions input by a user. For example, a user may input an instruction to set rules governing a use of coloration in digital content. However, where such content includes, for example, a photograph, it is likely that coloration characteristics set by a use instruction for the content as a whole will not be appropriate for application to the photograph. Consequently, a user inputting an instruction based on known techniques may cause content to be created with coloration characteristics inappropriate for application to the photograph. Further, even if a user makes an input document using various colors appropriate to the user's intention, a document output can be generated according to a predetermined coloration pattern which does not take into account the intention of the user.

SUMMARY

The invention provides a technique for performing coloration processing on a document in accordance with representative colors of an input document.

According to an aspect of the invention, there is provided a digital content creation system including: a representative color obtaining section that obtains from digital content input, a characteristic amount of at least one representative color for the digital content input, the digital content input including plural digital content sets and coloration information indicative of coloration for the plural digital content sets included in the digital content input; a coloration process determination section that determines coloration processing in accordance with the characteristic amount obtained by the representative color obtaining section; and a coloration processing section that changes the coloration information for the digital content sets included in the digital content input, in accordance with the coloration processing determined by the coloration process determination section. This digital content creation system is capable of changing, in accordance with a representative color of the digital content input (e.g., an input document), coloration thereof.

Preferably, in the digital content creation system, the representative color obtaining section includes: an image converting section that converts the digital content input into an input image including plural pixels, each pixel including information indicating its color; a block division section that divides the input image obtained by the conversion section into plural image blocks; an original block color calculation section that calculates a block color for each of the plural image blocks generated by the block division section, each block color characterizing pixels included therein; a block combining section that combines a target image block to be processed with an adjacent image block, to generate a combined image block, the target and adjacent image blocks having block colors satisfying a predetermined condition; a combined block-color calculation section that calculates a block color of the combined image block generated by the block combining section, based on the respective block colors of the target image block before being combined and the block color of the adjacent image block before being combined; a block number calculation section that calculates, for each of the combined image blocks, generated by the block combining section, a block count number representing the number of image blocks belonging to the combined image blocks; and a representative color determination section that determines the at least one representative color for the digital content input, based on the block count number calculated by the block number calculation section.

Also preferably in the digital content creation system, the representative color obtaining section includes: an image conversion section that converts the digital content input into an input image including plural pixels, each pixel including information indicating its color; a block division section that divides the input image obtained by the conversion section, into plural image blocks; an original block color calculation section that calculates a block color for each of the plural image blocks generated by the block division section, each block color characterizing pixels included therein; a classification section that classifies the plural image blocks into plural categories, based on a predetermined classification rule; a block number calculation section that calculates, for each of the categories, the number of image blocks belonging thereto; and a representative color determination section that determines at least one representative color for the digital content input, based on the block count number calculated by the block number calculation section.

Further, preferably in the digital content creation system, the coloration processing section is capable of performing coloration processing by use of at least two different algorithms, the representative color determination section gives priority ranks to the block colors, the highest priority being given to one of the block colors having the highest calculated number of image blocks, and determines, at least one of the block colors, as the at least one representative color for the digital content input, each having a priority rank or a block number which satisfies a predetermined condition, and the coloration process determination section determines whether the numbers of image blocks represented by block colors given the first and second highest priority ranks satisfy a predetermined relationship, to obtain a determination result, and further determines which one of the at least two algorithms should be used to perform coloration processing, based on the determination result.

Also preferably, the digital content creation system further includes: an image conversion section that converts the digital content input into an input image including plural pixels, each pixel including information indicating its color; a block division section that divides the input image obtained by the conversion section into plural image blocks; an original block color calculation section that calculates a block color for each of the plural image blocks generated by the block division section, the block color characterizing pixels included in the image blocks; a locating section that locates the plural image blocks in a predetermined color space related to the block colors; a classification section that enforces a classification rule for classifying the plural image blocks into plural categories, based on locations of the image blocks located by the locating section, so that differences between the numbers of image blocks classified in categories are equal to or smaller than a tolerable value; an index calculation section that calculates, for each of the plural categories, a dispersion index indicating a dispersion of image blocks belonging to the category in the color space; and a representative color determination section that determines the at least one representative color from the plural categories, based on the indices calculated by the index calculation section.

Further, preferably in the digital content creation system, the coloration processing section is capable of performing coloration processing by use of at least two different algorithms, the representative color determination section gives priority ranks to the block colors, the highest priority being given to the block colors having the smallest dispersion indicated by an index calculated by the index calculation section, and determines, as the at least one representative color for the digital content input, at least one of the block colors having a priority rank or a dispersion index which satisfies a predetermined condition, and the coloration process determination section determines whether the numbers of image blocks represented by block colors given first and second highest priority ranks satisfy a predetermined relationship, to obtain a determination result, and further determines which one of the at least two algorithms should be used to perform coloration processing, based on the determination result.

Further, preferably in the digital content creation system, the characteristic amount includes one or both of the number of the at least one representative color and hue of the at least one representative color.

Also preferably, the digital content creation system further includes a storage section that stores a plurality of combinations, each combination including an identifier specifying a color and a coloration rule corresponding to the color, wherein the coloration process determination section determines use of a coloration rule among a plurality of coloration rules, the coloration rule related to a color distance to the at least one representative color obtained by the representative color obtaining section, and in accordance with the coloration rule, use of which has been determined by the coloration process determination section, the coloration processing section changes the coloration information for digital content sets included in the digital content input.

Also preferably the digital content creation system further includes a tone determination section that determines a tone of color used for coloration processing, wherein the coloration processing section matches tones of colors of the plural digital content sets included in the digital content input with the tone determined by the tone determination section.

Further, preferably in the digital content creation system, the coloration information for the plural digital content sets includes three elements: hue, chroma, and brightness, and the coloration processing section matches one or both of the chroma and brightness of the plural digital content sets.

Also preferably in the digital content creation system, the coloration processing section performs at least two different types of coloration processing, and includes an output section that outputs results of the at least two different types of coloration processing, and a result selection section that selects one of the results of the at least two different types of coloration processing.

According to another aspect of the invention, there are provided a program and a storage medium storing the program, the program causing a computer to function as: a representative color obtaining section that obtains, from digital content input, a characteristic amount concerning at least one representative color for the digital content input, the digital content input including plural digital content sets and coloration information indicative of coloration for the plural digital content sets included in the digital content input; a coloration process determination section that determines coloration processing in accordance with the characteristic amount obtained by the representative color obtaining section; and a coloration processing section that changes the coloration information for the digital content sets included in the digital content input, in accordance with the coloration processing determined by the coloration process determination section.

BRIEF DESCRIPTION OF THE DRAWINGS

The invention will be described with reference to the accompanying drawings, wherein like numbers refer to like elements.

DESCRIPTION OF EXEMPLARY EMBODIMENTS

Embodiments of the invention will now be described with reference to the drawings.

Figure 1:
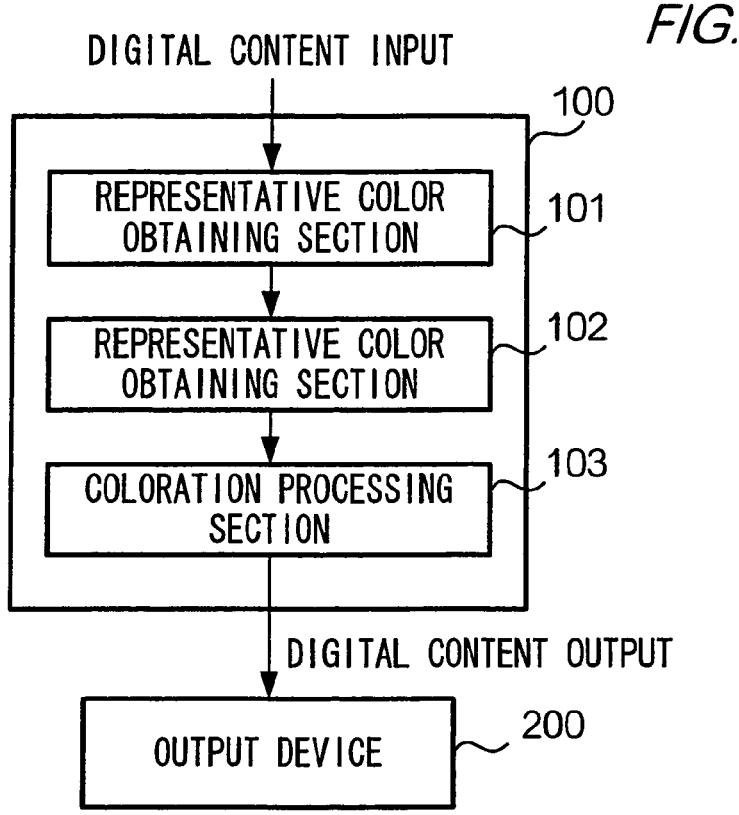
FIG. 1 is a block diagram showing a functional configuration of a digital content creation device 100.

FIG. 1 is a block diagram showing a functional configuration of a digital content creation device 100 according to an embodiment of the invention. The digital content creation device 100 performs processing for changing colorization of digital content input and generating digital content output.

The digital content creation device 100 outputs a generated digital content to an output device 200. The output device 200 is, for example, a display device such as a LCD (Liquid Crystal Display) or a CRT (Cathode Ray Tube), an image forming device such as a printer, or a different image processing device such as a server. The term "digital content" refers to digital data indicative of texts, images, and the like or an aggregate thereof. Digital content includes various kinds of text data such as titles, text bodies, and catch phrases, as well as various kinds of image data such as backdrops, human images, diagrams, animal images, and commercial product images. Each of the digital content sets constituting digital content includes information indicative of a property expressing whether the digital content set is text or image. The terms "digital content input" and "digital content output" each refer to an aggregate of plural digital content sets laid out in a predetermined region. Digital content input and output each include plural digital content sets, location information indicative of locations of the digital content sets in a document, and colorization information indicative of colors of the digital content sets to be colored when the digital content sets are output. The digital content input can be created by the digital content creation device 100 or a different device. If the digital content input is created by a different device, the digital content creation device 100 receives the digital content input via an I/F 140 and stores the input in a RAM 130 or HDD 150.

A representative color obtaining section 101 obtains a representative color and a characteristic amount of the representative color from digital content input. The term "representative color" refers to a color obtained from colorization information of the digital content and indicates a characteristic of the digital content. In this embodiment, the term "characteristic amount" of a representative color includes at least one of: hue, brightness, and chroma. A colorization processing determination section 102 determines what color processing should be executed, based on the representative color obtained from the digital content input. In accordance with a determination made by the colorization processing determination section 102, a colorization processing section 103 performs colorization processing for changing colorization information of digital content and generates digital content output.

Figure 2:
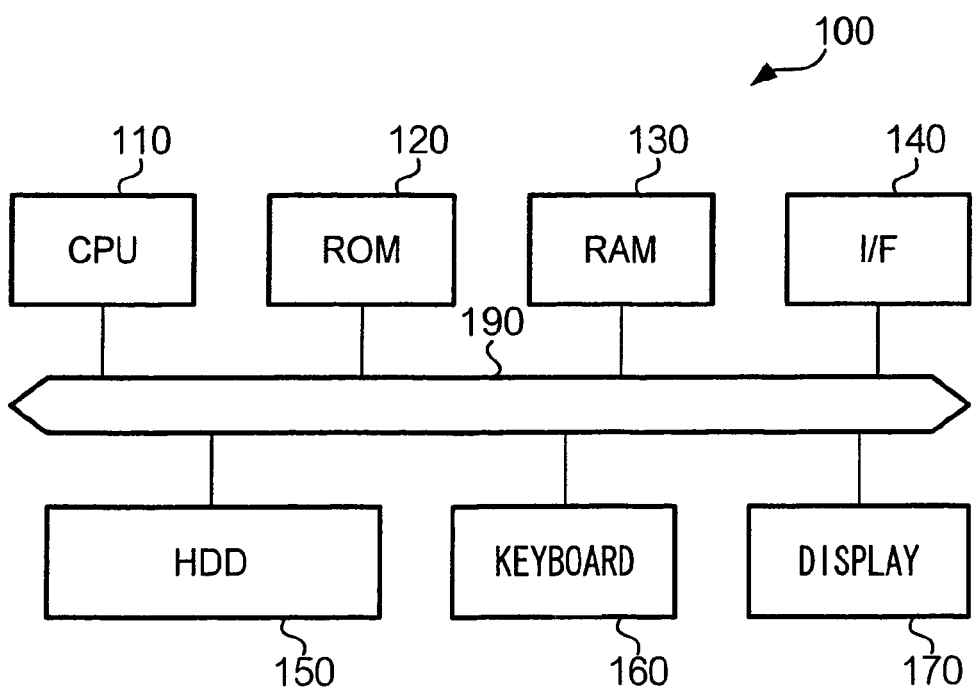
FIG. 2 shows a hardware configuration of the digital content creation device 100.

FIG. 2 is a block diagram showing a hardware configuration of the digital content creation device 100. A CPU (Central Processing Unit) 110 performs various control and calculation processing. A RAM (Random Access Memory) 130 is a main storage. A ROM (Read Only Memory) 120 is a memory device dedicated to reading only. An I/F 140 is an interface which transmits/receives data and control signals to/from other electronic devices. A (Hard Disk Drive) HDD 150 is a memory device which stores various programs and data. In this embodiment, the HDD 150 stores a digital content creation program. A keyboard 160 and a display 170 are user interfaces which allow users to operate the digital content creation device 100 and to input data and the like. These components are connected mutually via a bus 190. As the CPU 110 executes the digital content creation program, the digital content creation device 100 becomes capable of performing functions corresponding to functional components as shown in FIG. 1.

Figure 3:
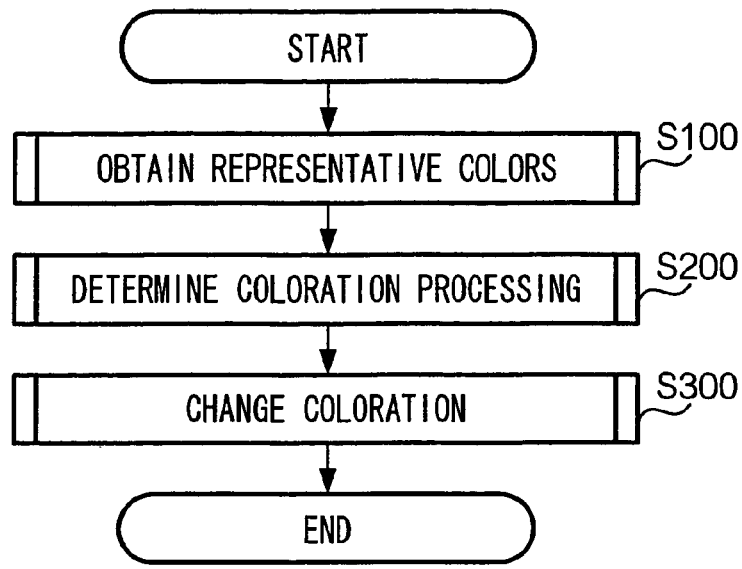
FIG. 3 is a flowchart showing an outline of digital content creation processing.

FIG. 3 is a flowchart showing an outline of digital content creation processing. When an instruction to execute a digital content creation program is input by a user via the keyboard 160, the CPU 110 reads the digital content creation program from the HDD and executes the program. At first, in a step S100, the CPU 110 obtains a representative color from digital content input. To obtain a representative color, for example, a technique disclosed in JP-A-2005-108137 can be used. Details of the technique are described in JP-A-2005-108137, and therefore, only an outline of a representative color obtaining processing will now be described. The representative color obtaining processing is performed by any of the exemplary modes described below.

A. First Mode (a-0) The CPU 110 converts digital content input into an input image consisting of plural pixels, each pixel including information indicating its color. The CPU 110 stores the input image into the RAM 130.

(a-1) The CPU 110 divides the input image into plural image blocks, each having a predetermined size. Each image block includes plural pixels. Each pixel has information indicative of its color. The CPU 110 determines, as a block color, an average color of all pixels in each image block. The term "block color" refers to a color indicative of a characteristic of the block image. The CPU 110 stores in the RAM 130 identifiers specifying block colors, as well as identifiers with the former identifiers being associated with the latter.

(a-2) If a block color of a certain image block (which is referred to as a "target image block" hereinafter) and a block color of an image block (hereinafter referred to as an "adjacent image block") which is adjacent to the target image block satisfy a condition of being "similar colors" (e.g., a difference in hue between colors is equal to or lower than a predetermined threshold value), the CPU 110 combines the target and adjacent image blocks into a new image block (hereinafter referred to as a "combined image block"). That is, the CPU 110 generates an identifier, specifying the combined image block and stores the identifier in the RAM 130. The identifier specifying the combined image block is associated with identifiers specific to original (not-combined) image blocks included in the combined image block. The CPU 110 determines, as a block color of the combined image block, an average color of the target and adjacent image blocks or an average color of all the pixels that belong to the combined image block. The CPU 110 stores in the RAM 130 an identifier specifying the determined block color, in association with the identifier specific to the combined image block. For every image block including such combined image blocks, the CPU 110 makes a determination about the above condition and combines image blocks if the condition is satisfied.

(a-3) Upon completion of processing as described above for every image block, the CPU 110 counts original image blocks that belong to each combined image block. The term, "original image blocks" refers to image blocks obtained by dividing digital content input, i.e., image blocks before being combined. The CPU 110 stores the numbers of original image blocks, associated with identifiers specific to combined image blocks.

(a-4) The CPU 110 determines representative colors of the digital content input, based on the numbers of counted original image blocks. For example, the CPU 110 arranges combined image blocks in order, starting with the image block including the greatest number of counted original image blocks. The CPU 110 determines, as representative colors of the digital content input, block colors of combined image blocks, each including a number of original image blocks which satisfies a predetermined condition, or block colors of combined image blocks ranked above a rank which satisfies a predetermined condition. For example, the CPU 110 determines as a representative color, a block color of a combined image block to which the greatest number of original image blocks belong. One or more representative colors are available. The CPU 110 can determine as representative colors, block colors of a predetermined number (e.g., two) of the combined image blocks in order, starting with the combined image block including the greatest number of original image blocks. Alternatively, the CPU 110 can determine as representative colors of digital content input block colors of combined image blocks each of which includes a greater number of original image blocks than a predetermined threshold value. The CPU 110 ranks representative colors in descending order, the highest priority being given to the representative color related to the greatest number of block. The CPU 110 stores in the RAM 130 information indicative of priority ranks of the representative colors, associated with identifiers of the block colors.

B. Second Mode (b-0) The CPU 110 converts digital content input into an input image consisting of plural pixels, each pixel including information indicative of its color.

(b-1) The CPU 110 divides the input image into plural image blocks. The CPU 110 determines a block color of each image block.

(b-2) The CPU 110 classifies the image blocks into plural categories depending on hue components of the block colors. The categories respectively correspond to evenly divided parts of a hue value range (e.g., a hue value range of 0 to 359 is divided by six). For example, one of the categories covers hue values 0 to 59, and another covers 60 to 119. Correspondence between the categories and hue values are determined in advance. The CPU 110 stores into the RAM 130 identifiers of the categories and identifiers of image blocks belonging to the categories, with the former identifiers associated with the latter identifiers.

(b-3) The CPU 110 calculates an average color among block colors of image blocks belonging to each of the categories. Average colors thus calculated are determined as representative colors of the categories, respectively.

(b-4) The CPU 110 counts the number of image blocks which belong to each category. The CPU 110 determines a representative color of the digital content input, based on the numbers of counted image blocks. For example, the CPU 110 determines as a representative color of the digital content input the representative color of the category which includes the greatest number of counted image blocks. As in the previous mode B, digital content input can have one or more representative colors. The CPU 110 can determine, as representative colors, block colors of a predetermined number (e.g., two) of categories in order, starting from the category including the greatest number of image blocks. Alternatively, the CPU 110 can determine, as representative colors, block colors of categories each of which includes a greater number of blocks than a predetermined threshold value. The CPU 110 prioritizes representative colors in order from the most block colors.

C. Third Mode (c-0) The CPU 110 converts digital content input into an input image consisting of plural pixels each including information indicative of a color of a related pixel.

(c-1) The CPU 110 divides the input image into plural image blocks. The CPU 110 determines a block color of each image block.

(c-2) The CPU 110 classifies the image blocks into plural small categories depending on hue components of the block colors. The small categories respectively correspond to evenly divided parts of a hue value range (egg., a hue value range of 0 to 356 is divided by 72). The CPU 110 stores into the RAM 130 identifiers of the small categories and identifiers of image blocks belonging to the small categories, with the former identifiers being associated with the latter.

(c-3) The CPU 110 classifies the small categories into large categories. The number of large categories is determined in advance. At this time, the CPU 110 classifies the small categories so that substantially the same number of image blocks belongs to each of the large categories. In other words, classification is performed so that a difference between the number of image blocks belonging to each of the large categories and a reference value is equal to or lower than a tolerance value. The CPU 110 stores in the RAM 130 identifiers respectively indicating the large categories and identifiers of image blocks belonging to the large categories, with the former identifiers being associated with the latter.

(c-4) The CPU 110 calculates an average color among block colors of image blocks belonging to each of the large categories. Average colors thus calculated are determined as representative colors of the large categories, respectively. The CPU 110 stores into the RAM 130 identifiers indicating the representative colors and the identifiers of the large categories, with the former identifiers being associated with the latter.

(c-5) For each of the large categories, the CPU 110 calculates a hue width (an index indicative of dispersion in a color space). The CPU 110 stores in the RAM 130 data expressing color widths and the identifiers of the large categories, with the data and identifiers being associated with one another. A color width is a difference between maximum and minimum hue values of image blocks belonging to a large category. The CPU 110 determines representative colors of digital content input, based on the calculated color widths. For example, the CPU 110 arranges the large categories in order, starting from the large category having the narrowest color width. For example, the CPU 110 determines as representative colors of the large categories, each of which has a color width or is ranked in a rank, the color width or rank satisfying a predetermined condition. Digital content input can have one or more representative colors. Representative colors of a predetermined number (e.g., two) of large categories, in order from the large category having the narrowest color width, can be determined as representative colors of digital content input. The CPU 110 prioritizes the representative colors in order from the narrowest color width. Alternatively, classification into large categories can be carried out first, omitting classification into small categories as described above.

D. Other Modes

The representative color obtaining processing is not limited to the modes A to C described above. For example, the CPU 110 can determine, as a representative color of digital content input, an average color of all pixels that constitute an input image obtained by converting the digital content input.

Next, in a step S200, the CPU 110 performs coloration process determination processing which determines a coloration processing mode, based on more than one representative color of digital content input. Details of the coloration process determination processing will be described later. Next, in a step S300, the CPU 110 performs coloration processing for changing coloration information of digital content input in accordance with the determined coloration processing mode. Details of the coloration processing will be described later.

Figure 4:
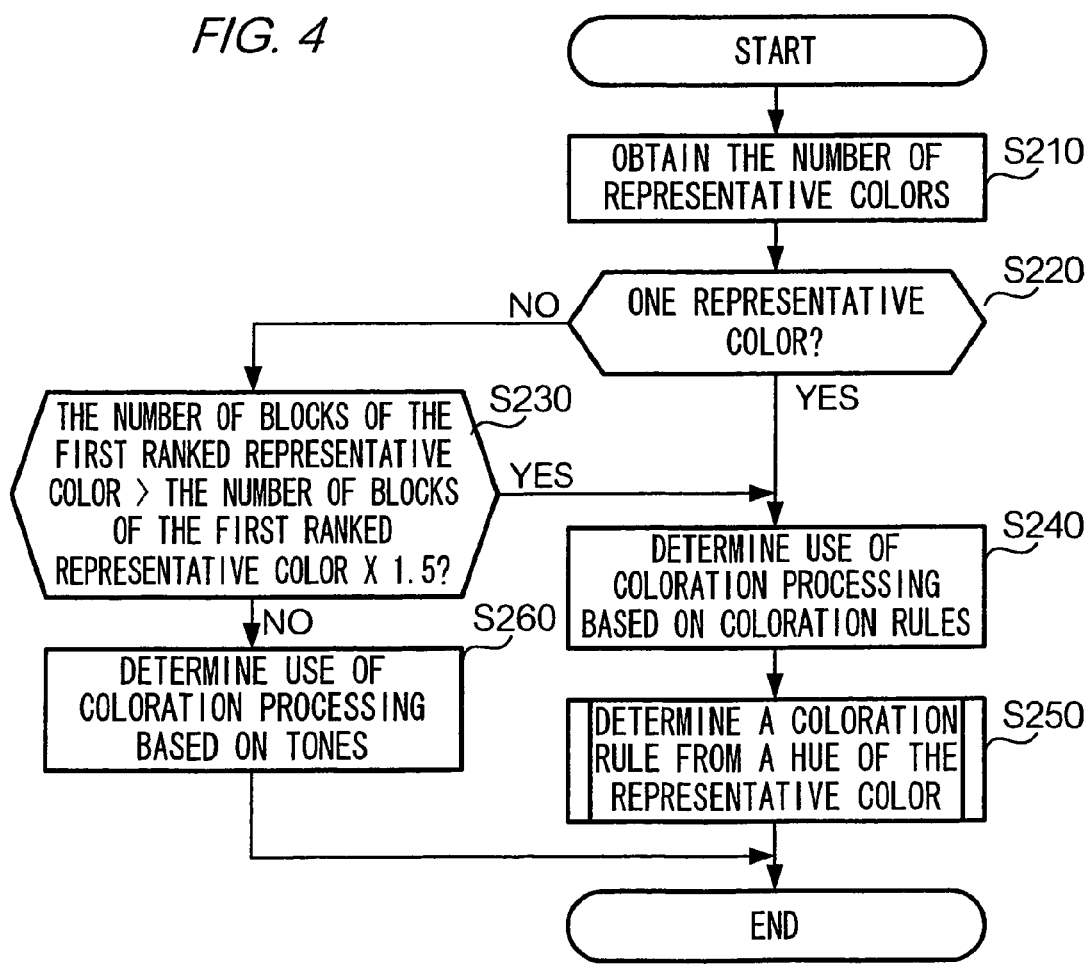
FIG. 4 is a flowchart showing details of coloration process determination processing.

FIG. 4 is a flowchart showing details of the coloration process determination processing. In a step S210, the CPU 110 obtains the number of representative colors as a characteristic amount of digital content input. Through the representative color obtaining processing in the step S100, the CPU 110 stores data indicative of the number of representative colors in the RAM 130. The CPU 110 reads the data indicative of the number of representative colors. In a step S220, the CPU 110 determines whether the number of representative colors is 1. If the number of representative colors is 1 (S220: YES), the CPU 110 advances the processing to a step S240. If the number of representative colors is not 1 (S220: NO), the CPU 110 advances the processing to a step S230.

In a step S230, the CPU 110 determines whether the number of image blocks belonging to a representative color given the first priority rank and the number of image blocks belonging to a representative color given the second priority rank satisfy a predetermined relationship. In this case, the predetermined condition is used to determine whether the number of image blocks belonging to a representative color given the first priority rank is sufficiently greater than that belonging to the representative color given the second priority rank. This embodiment uses as the predetermined condition an expression: (the number of image blocks belonging to the representative color in the first priority rank)>{(the number of image blocks belonging to the representative color in the second priority rank)×1.5} This conditional expression or constants used in the expression can be arbitrarily designed. If the number of image blocks belonging to the representative color in the first priority rank is determined to be sufficiently greater than that in the second priority rank (S230: YES), the CPU 110 advances the processing to a step S240. Otherwise, if the number of image blocks belonging to the representative color in the first priority rank is not determined to be sufficiently greater than that in the second priority rank (S230: NO), the CPU 110 goes to a step S260.

In the step S240, the CPU 110 determines execution of coloration processing based on coloration rules. Next, in a step S250, the CPU 110 determines a coloration rule used for the coloration processing, based on a hue of the representative color. Details of the coloration rule determination processing will be described later.

In a step S260, the CPU 110 determines execution of coloration processing based on tones. After determining this mode of coloration processing, the CPU 110 terminates the flow shown in FIG. 4.

Figure 5:
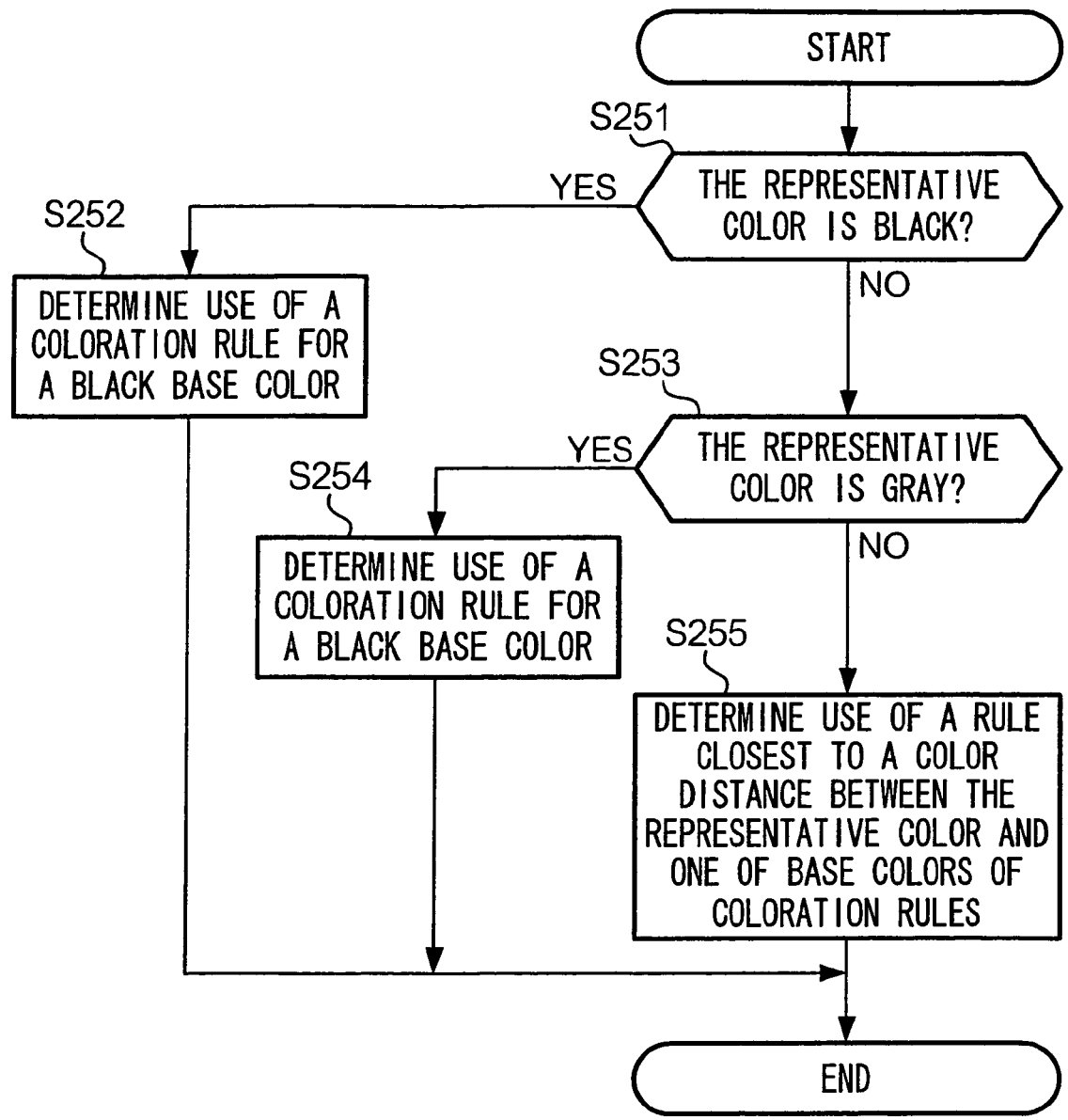
FIG. 5 is a flowchart showing details of coloration rule determination processing.
Figures 6, 7:
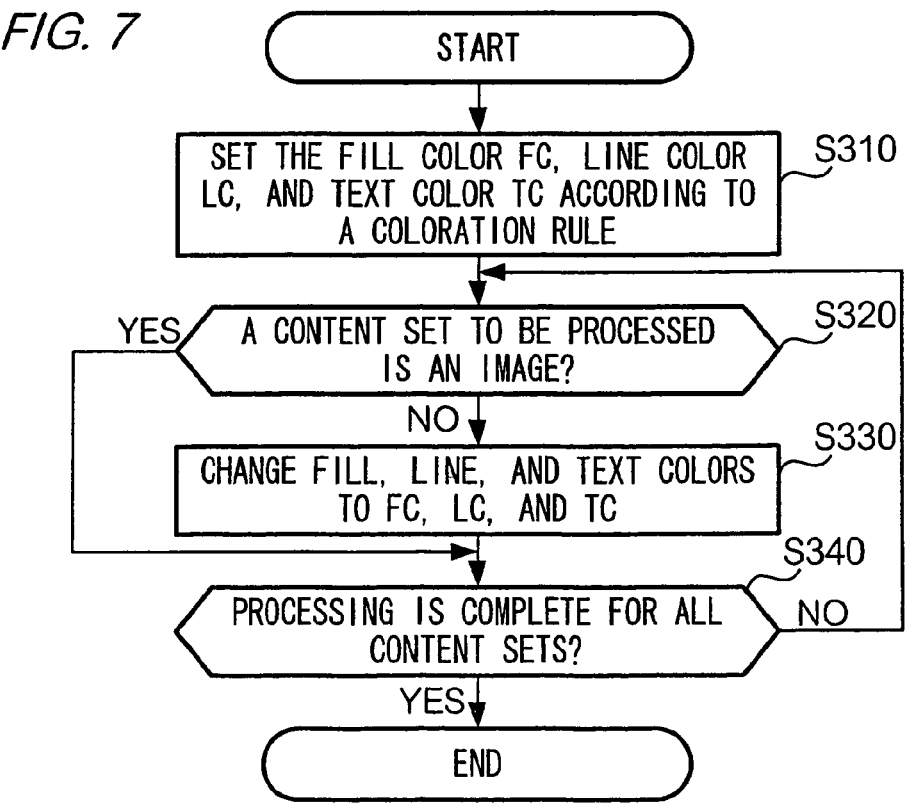
FIG. 6 shows an example of a coloration rule table used for the coloration rule determination processing.
FIG. 7 is a flowchart showing details of coloration processing based on coloration rules.

FIG. 5 is a flowchart showing details of the coloration rule determination processing. FIG. 6 shows an example of a coloration rule table used for the coloration rule determination processing. The digital content creation device 100 stores in advance in the HDD 150 or ROM 120 the coloration rule table TB1 shown in FIG. 6. In a step S251, the CPU 110 determines whether a representative color of the digital content input is black. If the representative color is black (S251: YES), the CPU 110 advances the processing to a step S252. In the step S252, the CPU 110 determines use of a coloration rule which takes black as a base color. Otherwise, if the representative color is not black (S251: NO), the CPU 110 advances the processing to a step S253.

In the step S253, the CPU 110 determines whether the representative color is gray or not. In this case, the "gray" includes white. If the representative color is gray (S253: YES), the CPU 110 advances the processing to the step S254. In the step S254, the CPU 110 determines use of a coloration rule which defines gray as a base color. Otherwise, if the representative color is not gray (S253: NO), the CPU 110 advances the processing to a step S255.

In the step S255, the CPU 110 specifies a base color a color distance to which is the shortest from the representative color, among base colors recorded in the coloration rule table TB1. The CPU 110 regards, as a color distance, a sum total of distances in R, G, and B color components or a distance in hue. The CPU 110 determines use of a coloration rule of the specified base color. The coloration rule table TB1 includes information as shown in FIG. 6. The coloration rule table TB1 stores plural combinations, each of which consists of an identifier indicative of a base color (and information indicative of hue of the base color) and a coloration rule related to the base color. The coloration rule includes identifiers specifying elements as targets to be subjected to coloration processing, and parameter values for coloration processing to be respectively applied to the elements. For instance, an element as a target to be subjected to coloration processing is information specifying one of elements constituting digital content, such as a fill area to be colored, a line, a text, etc. An example of a parameter value for coloration processing is brightness of each color component on the RGB color system. Provided that use of a coloration rule for a base color "red" is determined, fill areas are colored in a color specified by R=255, G=255, and B=150. Lines are colored in a color specified by R=255, G=185, and B=185, as well as texts are colored in a color specified by R=255, G=200, and B=0. The CPU 110 stores into the RAM 130 an identifier which specifies the selected base color.

In the step S300 in FIG. 3, coloration processing is carried out in accordance with determinations made in the step S200, as described above. In this embodiment, there are two available ways of coloration processing for the CPU 110, i.e., coloration processing based on coloration rules and coloration processing based on tones. That is, the CPU 110 is capable of performing coloration processing according to at least two different algorithms. The coloration processing is carried out for one after another of plural digital content sets constituting digital content input, specifying each of the plural content sets as a process-target digital content set to be processed.

FIG. 7 is a flowchart showing details of the coloration processing based on coloration rules. In a step S310, the CPU 110 sets parameters used for coloration processing, in accordance with a coloration rule. In this embodiment, a parameter FC indicative of a fill color, a parameter LC indicative of a line color, and a parameter TC indicative of a text color are set in accordance with the coloration rule determined as described above.

Next in a step S320, the CPU 110 determines whether a process-target digital content set is an image or not. Information indicating whether a process-target digital content set is an image is owned by itself. If the process-target digital content set is an image (S320: YES), the CPU 110 advances the processing to a step S340. Otherwise, if the process-target digital content set is not an image (S320: NO), the CPU 110 advances the processing to a step 330.

In the step S330, the CPU 110 performs coloration processing using the parameters FC, LC, and TC. That is, the fill color, line color, and text color are respectively changed to colors specified by the parameters FC, LC, and TC.

In the step S340, the CPU 110 determines whether this processing is complete for all digital content sets included in digital content input or not. If the processing is not complete (S340: NO), the CPU 110 updates the process-target digital content set and repeats processing from the step S320 to S330. If the processing is complete for all the digital content sets of the digital content input (S340: YES), the CPU 110 terminates the processing shown in FIG. 7.

Figure 8:
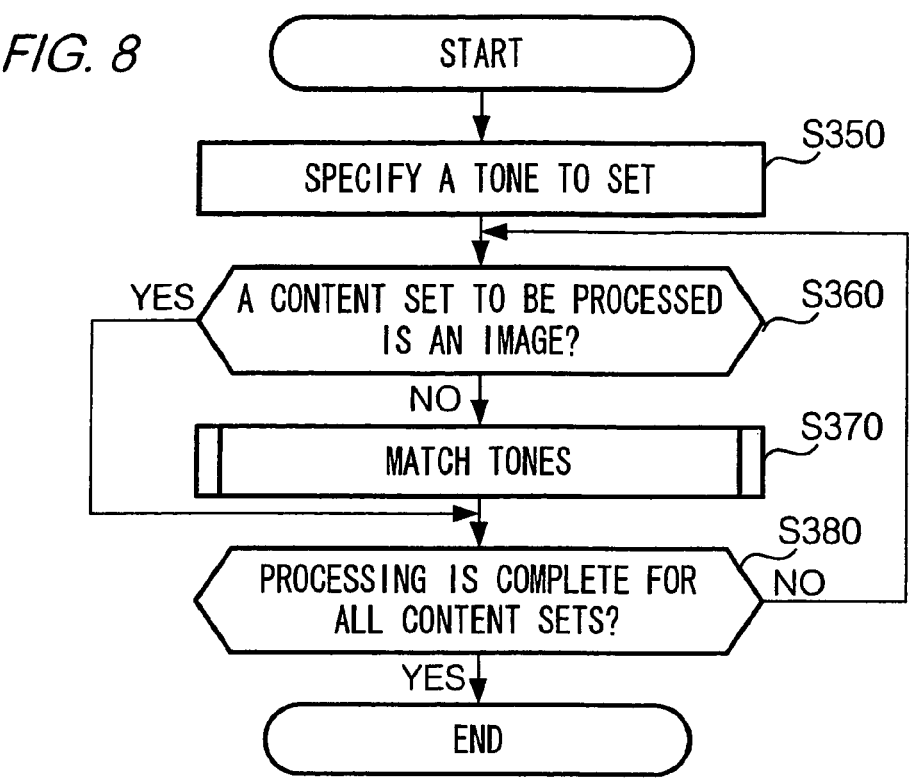
FIG. 8 shows a flowchart showing details of coloration processing based on tones.

FIG. 8 is a flowchart showing details of the other coloration processing based on tones. Tones of color are indices according to a complex conception which is expressed by a relationship between brightness and chroma of color. The CPU 110 determines a tone to be used for processing. For instance, the CPU 110 can determine a predetermined color as a tone. Alternatively, the CPU 110 can determine a tone to be set, based on digital content input. For instance, if digital content input includes an image, the CPU 110 can calculate a tone of the image and determine the calculated tone as the tone used for processing. If digital content input includes plural images, one of the plural images is selected and a tone is determined from the selected image. Alternatively, the CPU 110 can determine a tone of the representative color of digital content input, as the tone to be used for processing.

Next in a step S360, the CPU 110 determines whether a process-target digital content set is an image or not. If the process-target digital content set is an image (S360: YES), the CPU 110 advances the processing to a step S380. Otherwise, if the process-target digital content set is not an image (S360: NO), the CPU 110 advances the processing to a step S270.

In the step S370, the CPU 110 performs processing for matching tones. Details of the tone matching processing will be described later.

In the step S280, the CPU 110 determines whether processing is complete for all digital content sets included in the digital content input. If the processing is not complete (S380: NO), the CPU 110 updates the process-target digital content set and repeats processing from the step S360 to S370. If the processing is complete (S380: YES), the CPU 110 terminates the processing shown in FIG. 8.

Figure 9:
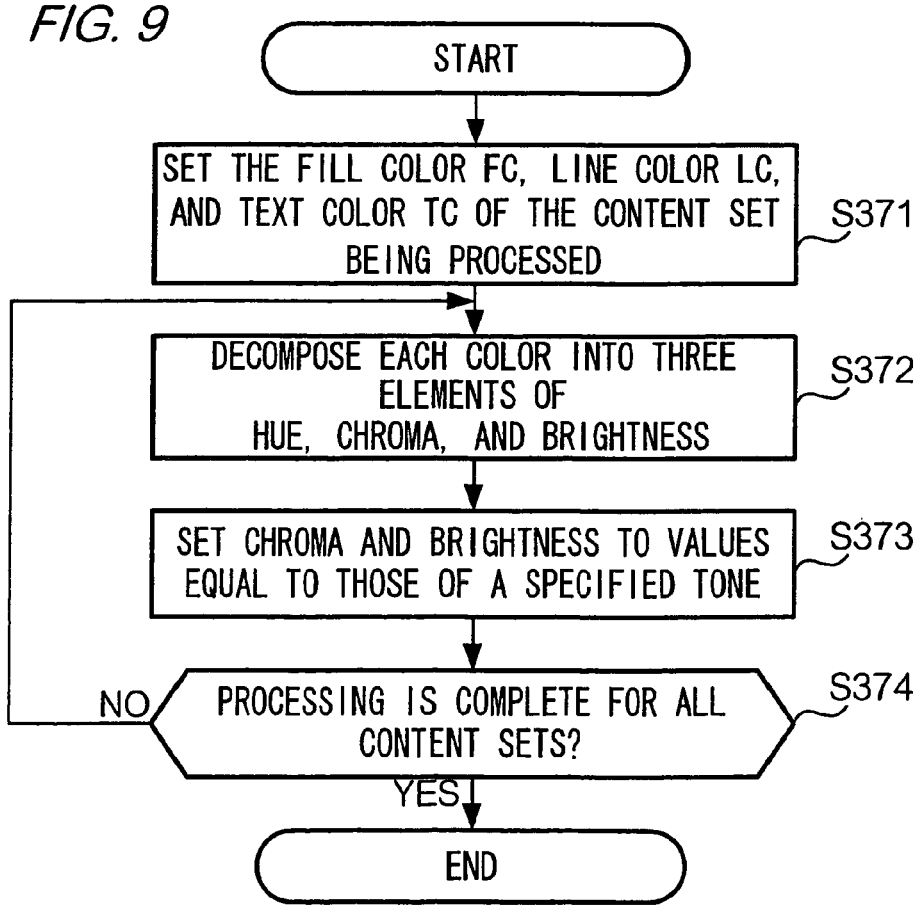
FIG. 9 is a flowchart showing details of tone matching processing.

FIG. 9 is a flowchart showing details of the tone matching processing. In a step S371, the CPU 110 obtains the fill color FC, line color LC, and text color TC for a process-target digital content set. In FIG. 9, the CPU 110 specifies one after another of elements as targets to be processed (e.g., color fill areas, lines, and/or texts), and subjects each of the process-target elements to processing as follows. That is, in the next step S372, the CPU 110 decomposes one of FC, LC, and TC targets to be now processed into three elements of hue, chroma, and brightness. Next, in a step S373, the CPU 110 changes values of chroma and brightness so as to become equal to values of a tone determined previously in the step S350. Digital content output is thus generated. Next, in a step S374, the CPU 110 determines whether or not processing is complete for all of the colors FC, LC, and TC. If the processing is not complete (S374: NO), the CPU 110 repeats processing from the step S372 to 373. Otherwise, if the processing is complete (S374: NO), the CPU 110 terminates the processing shown in FIG. 9.

The digital content creation device 100 outputs the digital content output generated as described above to an output device 200.

Figure 10A:
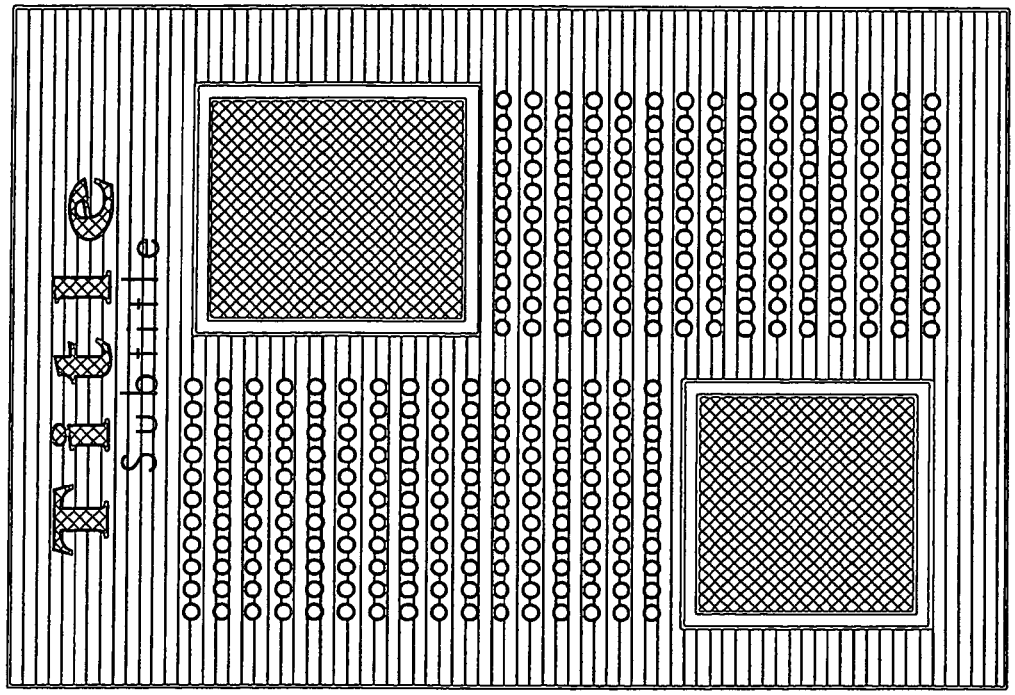
FIG. 10 shows an example of a processing result according to an embodiment of the invention.
Figure 10B:
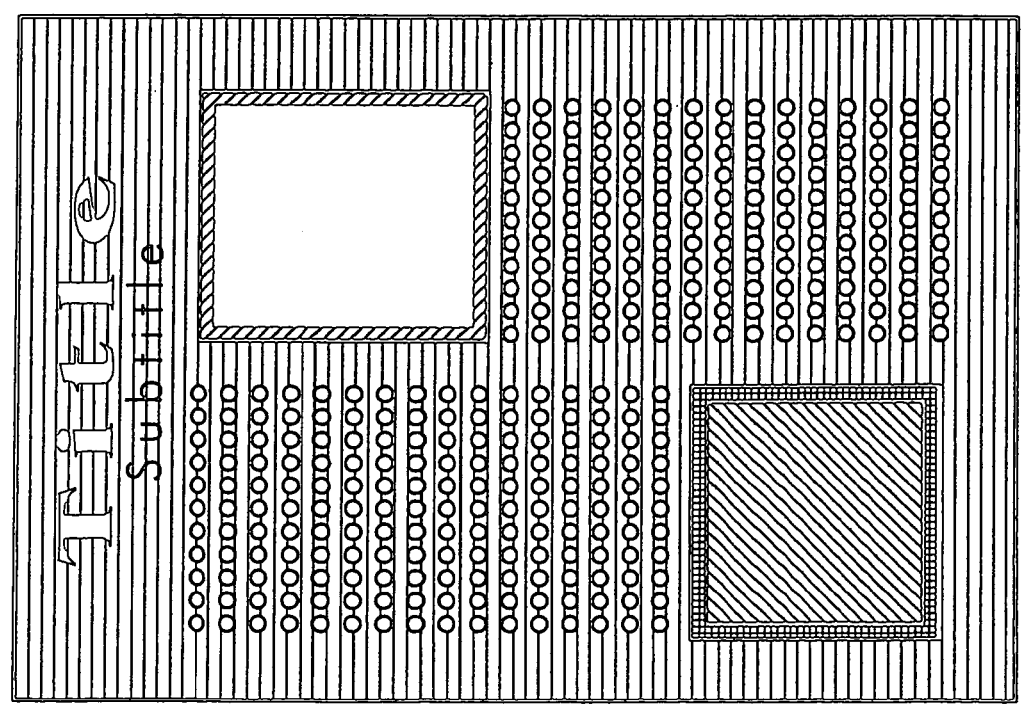
Figure 11A:
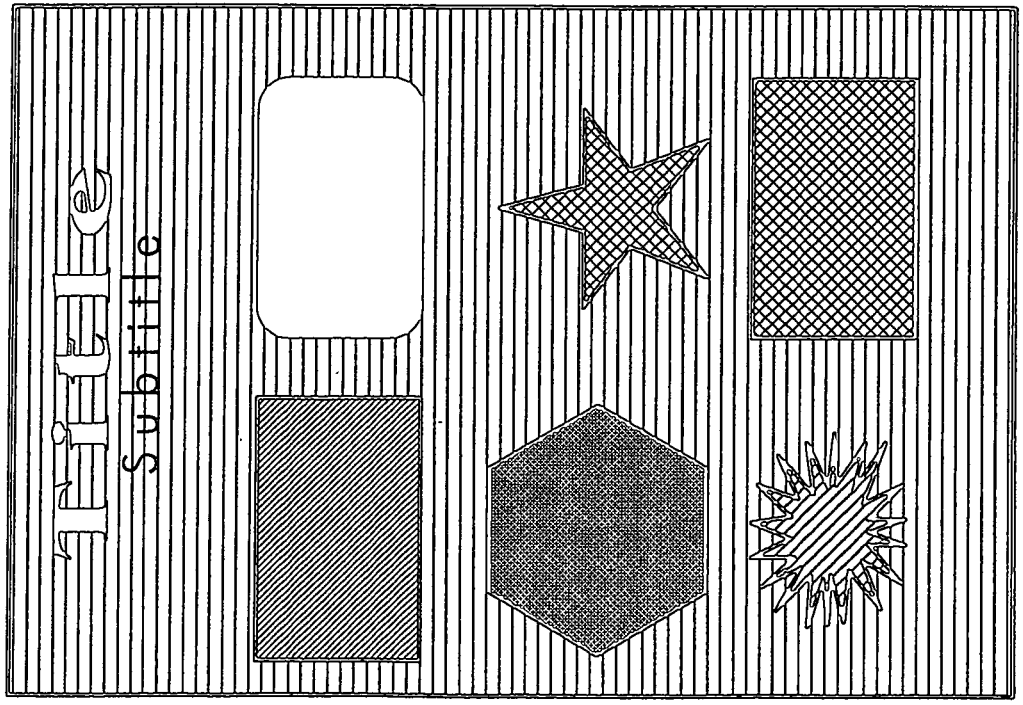
FIG. 11 shows another example of a processing result according to the embodiment.
Figure 11B:
Figure 11B:
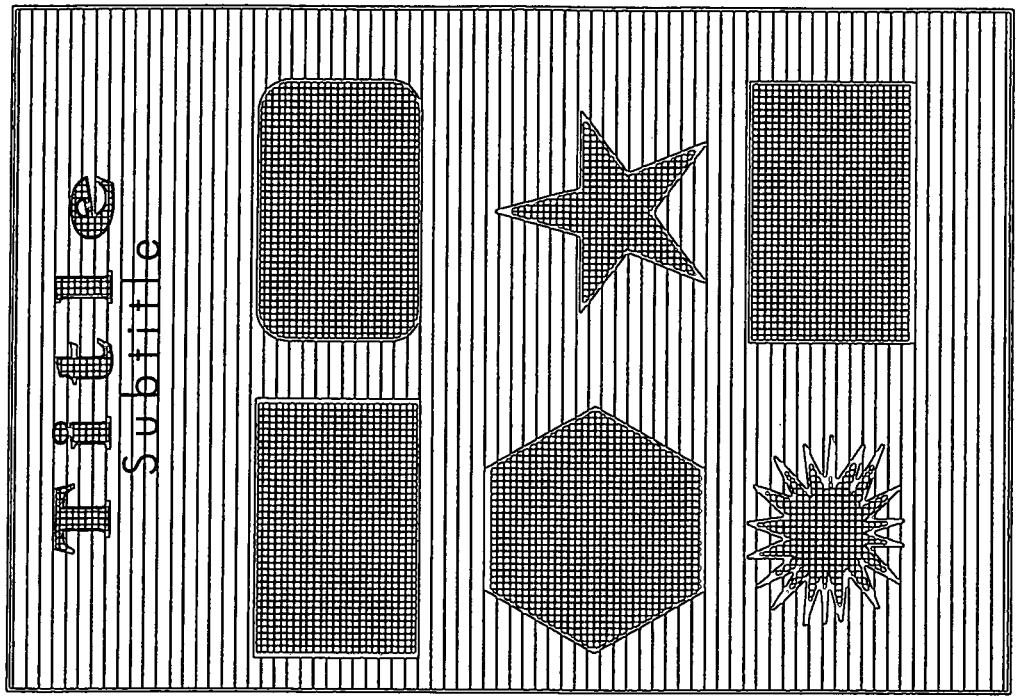

FIGS. 10 and 11 show exemplary processing results according to this embodiment. Since these figures are monochromatic, colors and tones are substituted with hatchings. FIG. 10A shows digital content input including images and texts as digital content sets. Although these digital content sets which have no consistency in color, the digital content output of these digital content sets attains color consistency as shown in FIG. 10B. FIG. 11A shows digital content input including plural figures. Digital content sets which have no consistency in color in this digital content input attain color consistency as digital content output shown in FIG. 11B. If the output device 200 is an image forming apparatus such as a printer, digital content output is printed as an image on a paper sheet. Alternatively, if the output device 200 is a server device such as a web server, digital content output is stored in HTML format or the like, which can be browsed via a network such as the internet or a LAN (Local Area Network). In this case, for instance, a dynamic UI (User Interface) can be established so as to change background colors and text colors to suit an image being displayed.

According to this embodiment, a coloration rule is determined based on a representative color of a digital content input (e.g., an input document). Accordingly, digital content output colored in harmonious colors can be created automatically. Even if a creator uses a lot of colors in digital content input, the embodiment is capable of automatically creating digital content output having consistency in tones and harmonious coloration, taking into consideration the intention of the creator. Further, coloration information which digital content input has is used to determine coloration. Accordingly, digital content output subjected to harmonious coloration can be automatically created without inconveniencing a user.

The invention is not limited to the above embodiment but can be variously modified in practice.

The embodiment has been described with reference to modes in each of which digital content input is divided into image blocks, each including plural pixels, i.e., modes which employ block processing. However, units used in processing are not limited to blocks of this type. For instance, an image block having a size of 1×1 pixel, i.e., one pixel can be used as a unit used in processing.

With reference to FIGS. 7 and 8, the embodiment has also described a mode which avoids the processing of changing coloration (or colors) if a process-target digital content set is an image. However, an image can be a target to be subjected to coloration processing. In this case, the CPU 110 performs coloration processing for each of the pixels constituting the image.

The embodiment has also described a mode in which the digital content creation device 100 as one single device carries out coloration change processing for digital content input. However, a digital content creation system constituted by plural devices can be configured so as to carry out the coloration change processing for digital content input.

The step S350 in FIG. 8 has been described with reference to a mode in which one single tone is specified as a tone used for coloration processing. This configuration can be arranged so as to specify plural tones. In this case, the CPU 110 generates plural candidates for digital content output, based on plural tones. The CPU 110 displays the plural digital content output candidates listed in order on the display 170. A user operates the keyboard 160 or the like to specify one of the plural digital content output candidates. The CPU 110 determines the specified digital content output candidate as digital content output.

In the coloration rule determination processing, a case of using black or gray as a representative color is processed first by exceptional processing, prior to determination of a coloration rule through the step S255. However, this exceptional processing can be omitted, i.e., processing from step S251 to S254 can be omitted.

The embodiment has exemplified a fill color, line color, and text color as target elements to be subjected to coloration processing in digital content sets. These are not the only target elements that can be processed but various other elements can also be exemplified. For instance, various elements such as a shadow color and transparency are available as targets to be processed.

What is claimed is:

1. A digital content creation system comprising:
  a representative color obtaining section that obtains, from digital content input, a characteristic amount of at least one representative color for the digital content input, the digital content input including a plurality of digital content sets and coloration information indicative of coloration for the plurality of digital content sets included in the digital content input;
  a coloration process determination section that determines coloration processing in accordance with the characteristic amount obtained by the representative color obtaining section; and a coloration processing section that changes the coloration information for the digital content sets included in the digital content input, in accordance with the coloration processing determined by the coloration process determination section.

2. The system according to claim 1, wherein the representative color obtaining section includes:

an image convert section that converts the digital content input into an input image including a plurality of pixels, each pixel including information respectively indicating a color of the pixel;

a block division section that divides the input image obtained by the conversion section, into a plurality of image blocks;

an original block color calculation section that calculates a block color for each of the plurality of image blocks generated by the block division section, the block color characterizing pixels included in one of the image blocks concerned;

a block combine section that combines a target image block to be processed from among the plurality of image blocks with an image block which is adjacent to the target image block, to generate a combined image block, the target and adjacent image blocks having block colors satisfying a predetermined condition;

a combined block color calculation section that calculates a block color of the combined image block generated by the block combine section, based on the block color of the target image block before being combined and the block color of the adjacent image block before being combined;

a block number calculation section that calculates, for each of the combined image blocks generated by the block combine section, a block count number as the number of image blocks belonging to one of the combined image blocks; and a representative color determination section that determines the at least one representative color for the digital content input, based on the block count number calculated by the block number calculation section.

3. The system according to claim 1, wherein the representative color obtaining section includes:

an image conversion section that converts the digital content input into an input image including a plurality of pixels, each pixel including information indicating a color of the pixel;

a block division section that divides the input image obtained by the conversion section, into plural image blocks;

an original block color calculation section that calculates a block color for each of the plurality of image blocks generated by the block division section, the block color characterizing pixels included in a related one of the image blocks;

a classification section that classifies the plurality of image blocks into a plurality of categories, based on a predetermined classification rule;

a block number calculation section that calculates, for each of the categories, the number of image blocks belonging to one of the categories; and a representative color determination section that determines at least one representative color for the digital content input, based on the block count number calculated by the block number calculation section.

4. The system according to claim 2, wherein the coloration processing section is capable of performing coloration processing by use of at least two different algorithms, the representative color determination section gives priority ranks to the block colors in order, starting with a block color having the highest calculated number of image blocks, and determines, at least one of the block colors, as at least one representative color for the digital content input, each having a priority rank or a block number which satisfies a predetermined condition, and the coloration process determination section determines whether the numbers of image blocks represented by block colors given the first and second highest priority ranks satisfy a predetermined relationship or not, to obtain a determination result, and further determines which one of the two algorithms should be used to perform coloration processing, based on the determination result.

5. The system according to claim 1, further comprising:

an image conversion section that converts the digital content input into an input image including a plurality of pixels, each including information indicating a color of the pixel;

a block division section that divides the input image obtained by the conversion section, into a plurality of image blocks;

an original block color calculation section that calculates a block color for each of the plurality of image blocks generated by the block division section, the block color characterizing pixels included in one of the related image blocks;

a locating section that locates the plurality of image blocks in a predetermined color space related to the block colors;

a classification section that enforces a classification rule for classifying the plurality of image blocks into a plurality of categories, based on locations of the image blocks located by the locating section, so that differences between the numbers of image blocks classified in the categories are equal to or smaller than a tolerable value;

an index calculation section that calculates, for each of the plurality of categories, a dispersion index indicating a dispersion of image blocks belonging to one of the categories in the color space; and a representative color determination section that determines the at least one representative color from the plurality of categories, based on the indices calculated by the index calculation section.

6. The system according to claim 5, wherein the coloration processing section is capable of performing coloration processing by use of at least two different algorithms, the representative color determination section gives priority ranks to the block colors in order, starting with a block color having the smallest dispersion indicated by an index calculated by the index calculation section, and determines, as the at least one representative color for the digital content input, at least one of the block colors each having a priority rank or a dispersion index which satisfies a predetermined condition, and the coloration process determination section determines whether the numbers of image blocks represented by block colors given first and second highest priority ranks satisfy a predetermined relationship or not, to obtain a determination result, and further determines which one of the two algorithms should be used to perform coloration processing, based on the determination result.

7. The system according to claim 1, wherein the characteristic amount includes one or both of a number of at least one representative color and hue of the at least one representative color.

8. The system according to claim 1, further comprising a storage section that stores a plurality of combinations, each combination including an identifier specifying a color and a coloration rule corresponding to the color, wherein
the coloration process determination section determines use of a coloration rule among a plurality of coloration rules, the coloration rule related to a color distance to the at least one representative color obtained by the representative color obtaining section, and
in accordance with the coloration rule, use of which has been determined by the coloration process determination section, the coloration processing section changes the coloration information for digital content sets included in the digital content input.

9. The system according to claim 1, further comprising a tone determination section that determines a tone of color used for coloration processing, wherein
the coloration processing section matches tones of colors of a plurality of digital content sets included in the digital content input with the tone determined by the tone determination section.

10. The system according to claim 9, wherein
the coloration information for the plurality of digital content sets includes three elements: hue, chroma, and brightness, and
the coloration processing section matches one or both of the chroma and brightness of the plurality of digital content sets.

11. The system according to claim 1, wherein
the coloration processing section performs at least two different types of coloration processing, and
the system further comprises:
an output section that outputs results of at least two different types of coloration processing; and
a result selection section that selects one of the results of at least two different types of coloration processing.

12. A storage medium storing a program that causes a computer to function as:
a representative color obtaining section that obtains, from digital content input, a characteristic amount concerning at least one representative color for the digital content input, the digital content input including a plurality of digital content sets and coloration information indicative of coloration for the plurality of digital content sets included in the digital content input;
a coloration process determination section that determines coloration processing in accordance with the characteristic amount obtained by the representative color obtaining section; and
a coloration processing section that changes the coloration information for the digital content sets included in the digital content input, in accordance with the coloration processing determined by the coloration process determination section.

13. The system according to claim 3, wherein
the coloration processing section is capable of performing coloration processing by use of at least two different algorithms,
the representative color determination section gives priority ranks to the block colors in order, starting with a block color having the highest calculated number of image blocks, and determines, at least one of the block colors, as at least one representative color for the digital content input, each having a priority rank or a block number which satisfies a predetermined condition, and
the coloration process determination section determines whether the numbers of image blocks represented by block colors given the first and second highest priority ranks satisfy a predetermined relationship or not, to obtain a determination result, and further determines which one of the two algorithms should be used to perform coloration processing, based on the determination result.

* * * * *